(12) United States Patent
Huang et al.

(10) Patent No.: US 10,124,280 B2
(45) Date of Patent: Nov. 13, 2018

(54) LAMINATED FILTER (71) Applicant: Guangdong Liansu Technology Industrial Co., Ltd, Foshan (CN)

(72) Inventors: Hongbin Huang, Foshan (CN); Jiyue Yang, Foshan (CN); Guangping Huang, Foshan (CN)

(73) Assignee: Guangdong Liansu Technology Industrial Co., Ltd. (CN)

(*) Notice: Subject to any disclaimer, the term of this patent is extended or adjusted under 35 U.S.C. 154(b) by 139 days.

(21) Appl. No.: 15/025,754

(22) PCT Filed: Nov. 6, 2013

(86) PCT No.: PCT/CN2013/086597
§ 371 (c)(1),
(2) Date: Mar. 29, 2016

(87) PCT Pub. No.: WO2015/043044
PCT Pub. Date: Apr. 2, 2015

(65) Prior Publication Data
US 2016/0243476 A1    Aug. 25, 2016

(30) Foreign Application Priority Data

Sep. 29, 2013 (CN) .......................... 2013 1 0450717

(51) Int. Cl.
*B01D 35/30* (2006.01)
*B01D 29/00* (2006.01)
(Continued)

(52) U.S. Cl.
CPC ............. *B01D 35/30* (2013.01); *B01D 29/13* (2013.01); *B01D 29/15* (2013.01); *B01D 29/66* (2013.01); *B01D 35/02* (2013.01)

(58) Field of Classification Search
None
See application file for complete search history.

(56) References Cited

U.S. PATENT DOCUMENTS 4,297,209 A * 10/1981 DeVisser ............... B01D 29/17
210/107
5,120,337 A * 6/1992 Benzler .............. B01D 46/0024
55/482
(Continued)

FOREIGN PATENT DOCUMENTS

CN    1879931 A    12/2006
CN    2875559 Y    3/2007
(Continued)

OTHER PUBLICATIONS

International Seach Report for Application No. PCT/CN2013/086597 dated Jul. 1, 2014.

*Primary Examiner* — Ana M Fortuna
(74) *Attorney, Agent, or Firm* — Lerner, David, Littenberg, Krumholz & Mentlik, LLP (57) ABSTRACT

A laminated filter comprises a housing inner sleeve filter element and head cover covering the housing, the housing having an inlet and a second outlet. An inner bottom face of the housing has a sealing ring, a bottom end of the inner sleeve being disposed between the sealing ring and an inner side of the housing, and a top end of the inner sleeve being disposed in the head cover. A bottom end of the filter element is disposed at an inner side of the sealing ring, and a top end of the filter element is disposed in the head cover. A gap communicating with the inlet is formed between the inner sleeve and housing. The top end of the inner sleeve has first filtrate openings, and the top end of the filter element has first and second baffle structures, the second baffle structures having second filtrate openings.

10 Claims, 5 Drawing Sheets

(51) Int. Cl.
  *B01D 29/07* (2006.01)
  *B01D 29/085* (2006.01)
  *B01D 39/10* (2006.01)
  *B01D 29/13* (2006.01)
  *B01D 35/02* (2006.01)
  *B01D 29/15* (2006.01)
  *B01D 29/66* (2006.01)

(56) References Cited

U.S. PATENT DOCUMENTS

2003/0178350 A1 9/2003 Harris et al.
2008/0047893 A1* 2/2008 Gerwin ................ B01D 25/001
                                                      210/342

FOREIGN PATENT DOCUMENTS

| CN | 201357011 Y | 12/2009 |
|----|-------------|---------|
| CN | 202724814 U | 2/2013 |
| CN | 203507635 U | 4/2014 |
| JP | 2011047396 A | 3/2011 |

* cited by examiner

LAMINATED FILTER

CROSS-REFERENCE TO RELATED APPLICATIONS

The present application is a national phase entry under 35 U.S.C § 371 of International Application No. PCT/CN2013/086597, filed Nov. 6, 2013, which claims priority from Chinese Application No. 201310450717.1, filed Sep. 29, 2013, all of which are hereby incorporated herein by reference.

TECHNICAL FIELD

The present invention relates to the technical field of filtration for agricultural irrigation water, more specifically, to a laminated filter.

BACKGROUND

Filters are devices used for filtering the liquid containing impurities. Particularly in the agricultural irrigation field, filtering the large particles in water is required to obtain purer irrigation water. The existing laminated filter basically consists of some major parts, such as housing, lamination, lamination support, pre-pressing spring, etc. The function of the pre-pressing spring is to provide a force pre-pressing the laminations, so that the laminations are combined closely. When pressurized water passes through the gap between the laminations, the particles in the water will be filtered.

The prior art, such as a laminated filter disclosed by the Chinese Patent Publication CN201357011, a micro-irrigation backflush laminated filter disclosed by the Chinese Patent Publication CN2875559 and an agricultural micro-irrigation system laminated filter disclosed by the Chinese Patent Publication CN202724814U, all adopt pre-pressing spring to provide the pressing force between the laminations.

During using filters, all the parts in the housing are immersed in water. When irrigation is not required, the parts in the housing are exposed in air. If made from carbon steel, the pre-pressing spring will lose efficacy in a short time due to corrosion. If made from stainless steel, the pre-pressing spring will lose efficacy in a short time due to elasticity attenuation. The consequence of the spring losing efficacy is that no pressing force exists between the laminations and the filter will lose the function to filter.

SUMMARY OF THE PRESENT INVENTION

In order to overcome at least one defect in the above-described prior art, the present invention provides a laminated filter which eliminates the conventional pre-pressing spring. The laminations for filtering are pressed by water flow pressure. The fully plastic structure of the filter not only greatly prolongs its working life, but also can greatly reduce the required pressure of the backflushing water for cleaning at the same time.

To solve the above-described technical problem, the technical solutions adopted in the present invention are as follows:

A laminated filter is provided, comprising a housing, an inner sleeve, an filter element and a head cover, the housing being provided with an inlet and a second outlet, the head cover covering on the housing, an inner bottom face of said housing being provided with a sealing ring, a bottom end of the inner sleeve being disposed between the sealing ring and an inner side of the housing, a top end of the inner sleeve being disposed in the head cover, a bottom end of the filter element being disposed at an inner side of the sealing ring, a top end of the filter element being disposed in the head cover, a certain gap being formed between said inner sleeve and housing, the inlet being communicated with the gap, the top end of said inner sleeve being provided with first filtrate openings, the top end of the filter element being provided with a first baffle structure and second baffle structures, second filtrate openings being disposed in the second baffle structures, the first filtrate openings being located on the same level with the first baffle structure and the second baffle structures, and the bottom end of the filter element further being provided with a first outlet communicated with the second outlet.

Water flow enters into the laminated filter through the inlet, passes through the first filtrate openings, enters into the second filtrate openings after being obstructed by the first baffle structure and the second baffle structures, then passes through the first outlet towards the second outlet and flows out of the laminated filter.

The laminated filter makes the water flow impact the first baffle structure and the second baffle structures after entering into the first filtrate openings, and thereby press the filter element. Such structure eliminates the pre-pressing spring. Since the filter has no metal components and is a fully plastic structure, the working life of the filter is prolonged. During backflushing, since there is no resistance of pre-pressing spring, the water pressure of the backflushing water is greatly reduced.

Further, said sealing ring divides the inner bottom face of the housing into an in-ring bottom plate and an out-ring bottom plate, a bottom edge of said inner sleeve contacting with the out-ring bottom plate and a bottom edge of the filter element contacting with the in-ring bottom plate.

The bottom edge of the inner sleeve contacts with the out-ring bottom plate, where a sealing effect is achieved. The water flow will only enter into the interior of the inner sleeve through the first filtrate openings rather than flows out from there when entering in between the inner sleeve and the housing. The bottom edge of the filter element contacts with the in-ring bottom plate, where a sealing effect is achieved, and the water flow won't flow out from there when entering in between the inner sleeve and the filter element.

Further, said first filtrate openings are a plurality of notch structures disposed at the top end of the inner sleeve, and the top shape of said notch structures matches and contacts with the inner wall shape of the head cover.

The water, entering in between the housing and the inner sleeve through the inlet, enters into the interior of the inner sleeve through the notch structures disposed on the top end of the inner sleeve and the further work is achieved.

Further, said filter element comprises a movably connected laminated fixator and a movable base, an upper end of the laminated fixator being provided with a top end plate which is a disk-shaped structure and is provided with the first baffle structure, the second baffle structures and the second filtrate openings.

Said inner sleeve is a tubular structure with a large diameter upper end connected with a small diameter lower end, and the joint is a horizontal step. The top end plate is disposed at the horizontal step of the inner sleeve, of which the diameter matches the large diameter of the inner sleeve.

After the water flow flows into the interior of the inner sleeve through the notches of the top end of the inner sleeve, the top end plate of the filter element is located at the horizontal step of the inner sleeve, obstructing the water flow on the top end plate. After being obstructed by the first baffle structure, the water flow retraces and impacts the second baffle structures. After being obstructed by the second baffle structures, the water flow flows into the lower part of the filter element through the second filtrate openings in the second baffle structures.

Further, said first baffle structure is disposed at the centre of the top end plate, with a structure of a plurality of bar-shaped projections connected with each other at one end. Adjacent two bar-shaped projections form an angle θ, and each angle θ is equal.

Due to the fluidity of water, the water entering into the top end plate of the filter element impacts the location of angle θ of the first baffle structure directly. The water flow being obstructed is refracted and retraces in the direction corresponding to angle θ, and the filter element impacted by the water flow is pressed downward.

Further, the number of said second baffle structures is equal to the number of the angles θ with one to one correspondence. The distances of each second baffle structure to the centre of the top end plate are the same.

The second baffle structures are "["-shaped structures consisting of three baffles. The notch direction of each of the "["-shaped structures is opposite to the direction of the corresponding angle θ, and the top of the "["-shaped structures match the shape of the inner wall of the head cover.

The water flow being refracted by the first baffle structure retraces and then impacts the notches of the "["-shaped structures of the second baffle structures. Since the "["-shaped structures of the second baffle structures consist of three baffles, the water flow is obstructed for the second time, and impacts the filter element again, and the filter element is further pressed downward.

Further, said second filtrate openings are through-holes disposed in the region of said "["-shaped structures. The speed of the water flow, after being impacted for the second time, is significantly reduced, and the water flow flows into the lower part of the filter element along the through-holes provided in the region of the "["-shaped structures of the second baffle structures.

Further, limiting strips are connected under the top end plate of said laminated fixator. Said limiting strips are structure of a plurality of fenders connected with each other and the number of said fenders is the same as the number of the second baffle structures. Each fender is disposed between every two through-holes, being at the lower part of the through-holes. The free ends of said limiting strips are provided with buckling structures.

Water flow flows into the lower part of the filter element through the through-holes, and flows downward along the fender structure on the limiting strips. The speed of the water flow with reduced speed will be improved under the action of gravity.

Further, an outer side of said movable base is provided with a sealing groove structure for placing a sealing circle, while an inner side is provided with a limiting ring matching the buckling structures on the limiting strips.

After the sealing circle is placed, the movable base is attached to the sealing ring on the housing, where the inner sleeve and the filter element are sealed.

Further, said first outlet is a connection gap between the laminated fixator and the movable base, and the lower part of the connection gap is the second outlet disposed on the housing.

The water flow with the improved speed falls to the movable base along the fenders structure of the filter element, flows out from the connection gap, and then flows out of the laminated filter from the second outlet, and thereby the whole filtration process of the water flow is completed.

Since there is no elastic function of the pre-pressing spring, the second outlet just needs to be taken as the inlet when the filter needs to be backflushed. The top end plate of the filter element is jacked up by the counter flow of the water flow, so that the filter element is no longer pressed and a gap is generated. The water flow flushes the solid substances retaining on the filter element and the backflush process is completed, to which no flushing water with high pressure needs to be provided.

Compared with the prior art, the present invention has the beneficial effects as follows:

A filter element structure of a laminated filter of the present invention may be pressed by the impact of the water flow alone, and the pre-pressing spring is eliminated. Since the filter has no metal components and is a fully plastic structure, the working life of the filter is prolonged. Since there is no pre-pressing spring, the water pressure of the backflushing water is greatly reduced.

DETAILED DESCRIPTION OF THE PREFERED EMBODIMENT

The present invention is further described in combination with the specific embodiments. Wherein, accompanying drawings are only used for exemplary illustration, which are schematic views rather than figures in kind, and should not be construed as limitation to the present patent. In order to better illustrate the Embodiments of the present invention, some parts are omitted, zoomed in or out in the accompanying drawings, but not represent the actual size of the product. It is understandable for those skilled in the art that some known structures and the description thereof may be omitted in the accompanying drawings.

In the accompanying drawings of Embodiments of the present invention, the same or similar numbers correspond to the same or similar parts. It is to be understood that, in the description of the present invention, if there are positions or location relationships indicated by the term "on", "down", "left", "right", etc being based on the orientation or position relationship illustrated by accompanying drawings, they are simply to facilitate the description of the present invention and simplify the description, rather than indicate or imply that the devices or elements must have specific positions, are constructed and are operated in specific positions. Therefore, the choice of words of location relationships described in the accompanying drawings is only used for exemplary illustration, and should not be construed as limitation to the present patent. Those having ordinary skill in the art can understand the specific meaning of the above-mentioned terms in accordance with the specific conditions.

Embodiment 1

Figure 1:
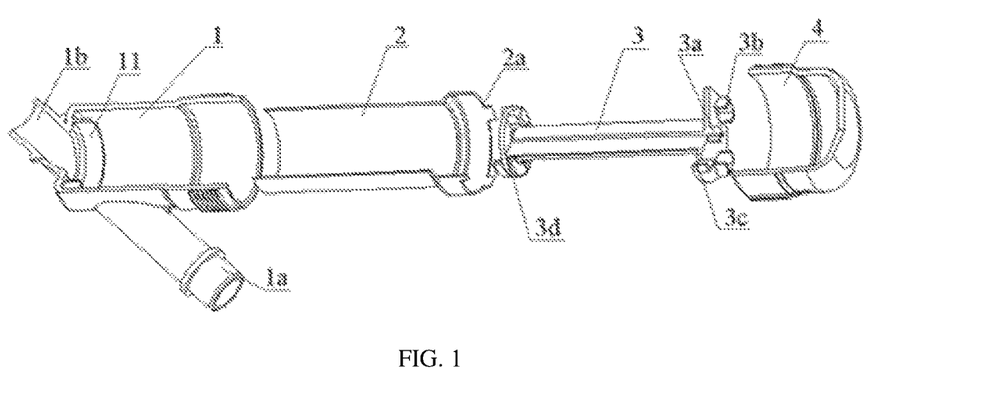
FIG. 1 is an overall exploded view of a laminated filter of Embodiment 1.
Figure 2:
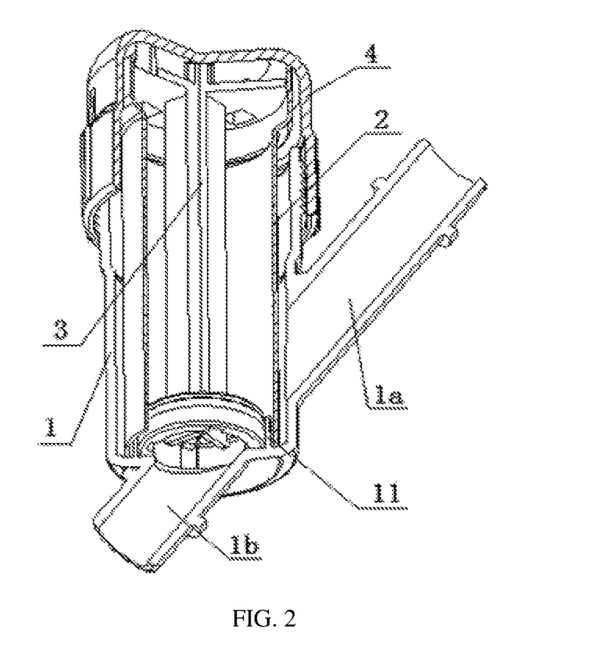
FIG. 2 is a sectional view of the whole structure of Embodiment 1.
Figure 3:
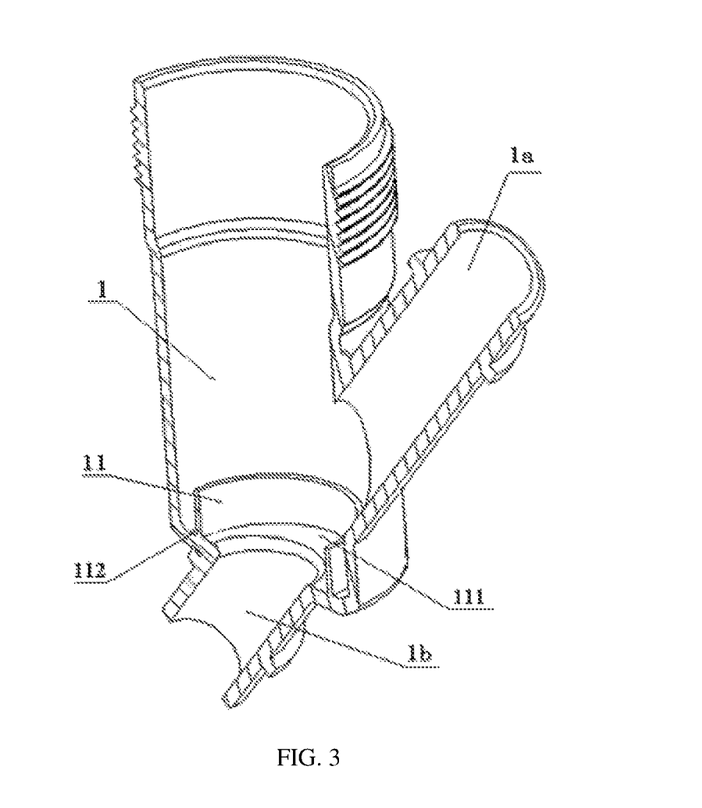
FIG. 3 is a sectional view of part 1 in FIG. 2.

The first Embodiment of the laminated filter of the present invention is shown in FIG. 1 to FIG. 7. As shown in FIG. 1, a laminated filter comprises a housing 1, an inner sleeve 2, a filter element 3 and a head cover 4, the housing 1 being provided with an inlet 1a and a second outlet 1b, the head cover 4 covering on housing 1, an inner bottom face of said housing 1 being provided with a sealing ring 11. As shown in FIG. 3, the sealing ring 11 divides the inner bottom face of the housing 1 into an in-ring bottom plate 111 and an out-ring bottom plate 112, a bottom end of the inner sleeve 2 being disposed between the sealing ring 11 and an inner side of the housing 1, a bottom edge of the inner sleeve 2 contacting with the out-ring bottom plate 112, a top end of the inner sleeve 2 being disposed in the head cover 4. A bottom end of the filter element 3 is disposed at an inner side of the sealing ring, the bottom end contacting with the in-ring bottom plate 111. A top end of the filter element 3 is disposed in the head cover 4. A certain gap is informed between said inner sleeve 2 and housing 1, the inlet being communicated with the gap. The top end of the inner sleeve 2 is provided with first filtrate openings 2a. The top end of the filter element 3 is provided with a first baffle structure 3a and second baffle structures 3b, second filtrate openings 3c being disposed in the second baffle structures 3b. The first filtrate openings 2a are located on the same level of the first baffle structure 3a and the second baffle structures 3b. The bottom end of the filter element 3 is provided with a first outlet 3d communicated with the second outlet 1b.

Figure 4:
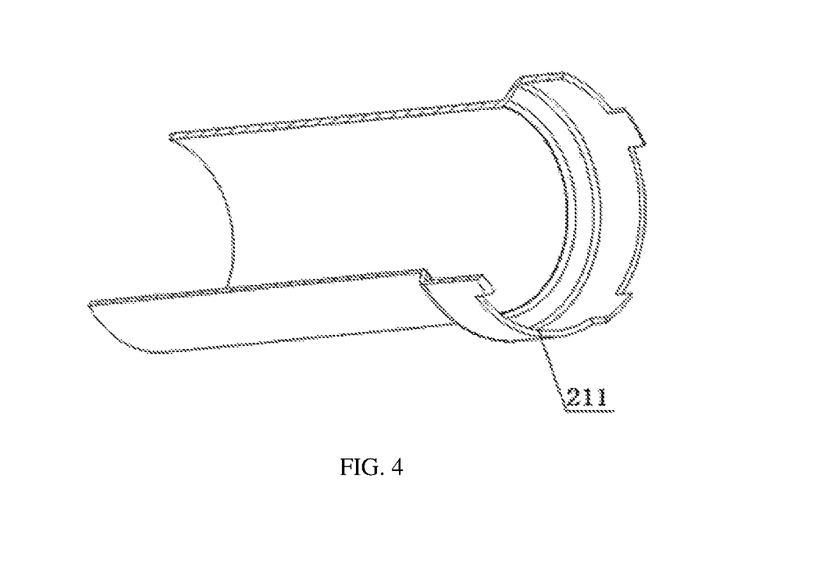
FIG. 4 is a sectional view of part 2 in FIG. 2.

As shown in FIG. 4, the inner sleeve 2 is a tubular structure with a large diameter upper end connected with a small diameter lower end, and the joint is a horizontal step. The first filtrate openings 2a are four notch structures 211 disposed at the top end of the inner sleeve 2. As shown in FIG. 2, the top shape of the notch structures 211 matches and contacts with the inner wall shape of the head cover 4.

Figure 5:
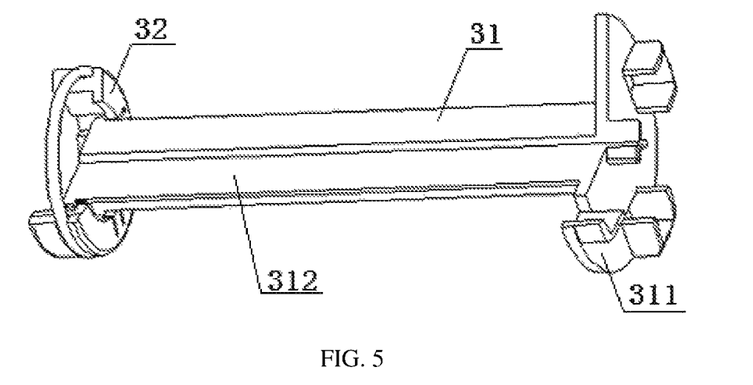
FIG. 5 is a sectional view of part 3 in FIG. 2.

As shown in FIG. 5, the filter element 3 comprises a movably connected laminated fixator 31 and a movable base 32, and the laminated fixator 31 comprises a top end plate 311 and limiting strips 312 which are connected with each other, supporting a filter laminae (not shown). The top end plate 311 is a disk-shaped structure, and is located at horizontal step of the inner sleeve 2, and the diameter of the top end plate 311 matches the large diameter of the inner sleeve 2.

Figure 6:
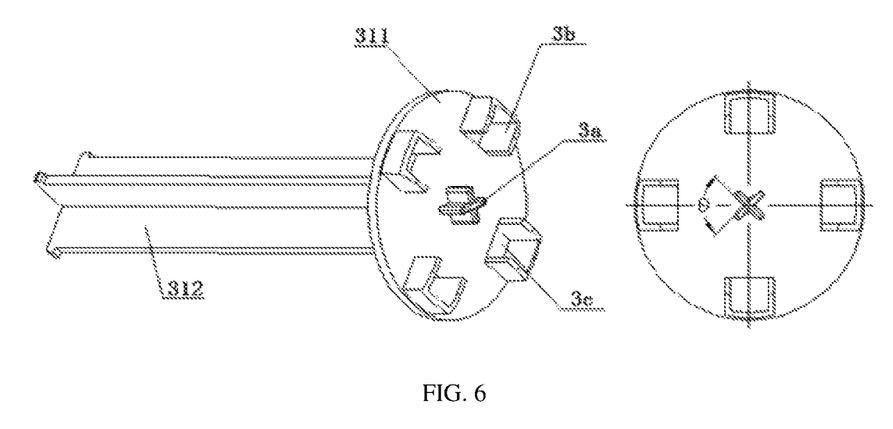
FIG. 6 is a schematic view if part 31 in FIG. 5.
Figure 7:
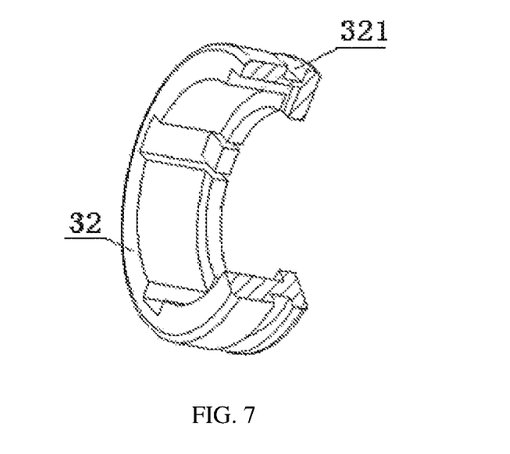
FIG. 7 is a sectional view of part 32 in FIG. 5.

As shown in FIG. 6, the first baffle structure 3a is projections disposed at the centre of the top end plate 311. The projections are a structure of four bar-shaped projections connected with each other at one end, forming a "+"-shape. Adjacent two bar-shaped projections form an angle θ, and each angle θ is equal. Four second baffle structures 3b are disposed on the top end plate 311, and the distances of four second baffle structures 3d to the centre of the top end plate 311 are the same. The second baffle structures are "["-shaped structures consisting of three baffles. The notch direction of each of the "["-shaped structures is opposite to the direction of the corresponding angle θ, and the top of the "["-shaped structures matches the shape of the inner wall of the head cover 4. The second filtrate openings 3c are square through-holes disposed in the region of the "["-shaped structures. The limiting strips 312 are a structure of four fenders connected with each other, and each of the fenders is disposed between every two through-holes. As shown in FIG. 7, an outer side of the movable base 32 is provided with a sealing groove structure 321 for placing a sealing circle. After the sealing circle is placed, the filter element and the housing 1 achieve a sealing effect.

As shown in FIG. 1, the first outlet 3d is a connection gap of the laminated fixator 31 and the movable base 32. The housing 1 at the lower part of the connection gap is provided with the second outlet 1b.

As shown in FIG. 2, water flow enters into the laminated filter through the inlet 1a, passes through the first filtrate openings 2a, enters in to the second filtrate openings 3c after being obstructed by the first baffle structure 3a and the second baffle structures 3b, then passes through the first outlet 3d towards the second outlet 1b and flows out of the laminated filter.

Embodiment 2

Figure 8:
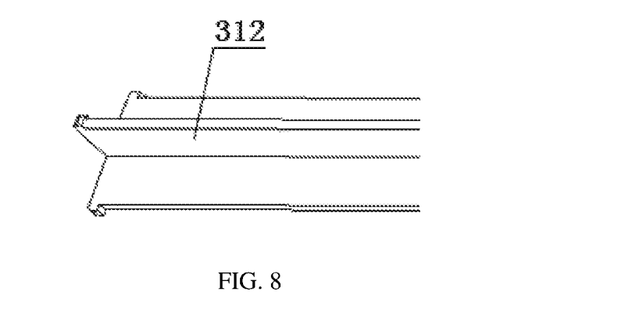
FIG. 8 is a schematic view of part 312 of the laminated filter in Embodiment 2.
Figure 9:
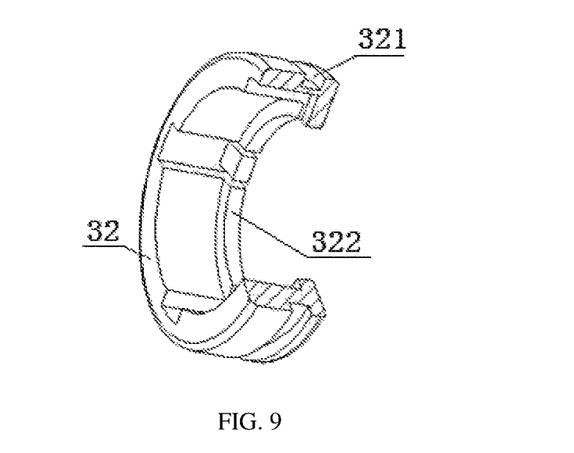
FIG. 9 is a schematic view of part 32 in Embodiment 2.
Figure 10:
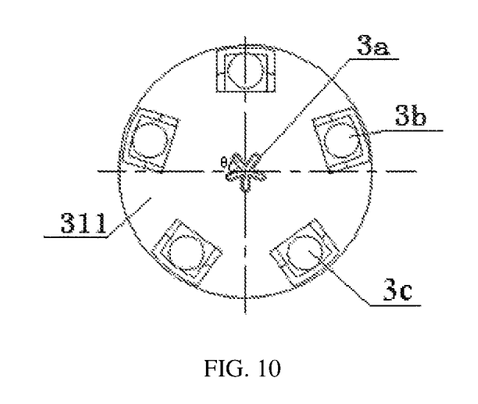
FIG. 10 is a schematic view of part 311 in Embodiment 2.

The second Embodiment of the laminated filter of the present invention is shown in FIG. 8 to FIG. 10. As shown in FIG. 8, the free ends of the limiting strips 312 of the lamination fixator 31 are provided with buckling structures. As shown in FIG. 9, an inner side of the movable base 32 is further provided with a limiting ring 322 matching the buckling structures on the limiting strips 312, achieving the connection of the lamination fixator 31 and the movable base 32, and the joint provides a gap for the water flowing out. As shown in FIG. 10, the first baffle structure 3a is projections disposed at the centre of the top end plate 311, and the projections are a structure of five bar-shaped projections connected with each other at one end. Adjacent two bar-shaped projections form an angle θ, and each angle θ is equal. Five second baffle structures 3b is disposed on the top end plate 311, and the distances of five second baffle structures 3d to the centre of the top end plate 311 are equal. The second baffle structures are "["-shaped structures consisting of three baffles. The notch direction of each of the "["-shaped structures is opposite to the direction of the corresponding angle θ, and the top of the "["-shaped structures match the shape of the inner wall of the head cover 4. The second filtrate openings 3c are circular through-holes disposed in the region of the "["-shaped structures. Said limiting strips 312 have five fenders, and each of the fenders is located between every two through-holes. The rest of the structure and working principle of this Embodiment are similar to Embodiment 1, and are not to be described herein.

Apparently, the above-described Embodiments of the present invention are just embodiments for describing the present invention clearly, but not limitation to the embodiments of the present invention. For those having ordinary skill in the art, variations in different forms can be made on the basis of the above description. All of the embodiments should not and could not be exhaustive. Any amendments, equivalent replacements and improvement made within the spirit and principle of the present invention shall all be included within the scope of protection of the claims of the present invention.

The invention claimed is:

1. A filter device, comprising: a housing having an interior region, an inner sleeve having an interior region and provided within the interior region of the housing, a filter element for filtering water containing solid substances to be retained on the filter element, the filter element provided within the interior region of the sleeve and including a top end plate, and a head cover, the housing provided with an inlet and a second outlet, characterized in that the head cover covers on the housing, an inner bottom face of said housing provided with a sealing ring, a bottom end of the inner sleeve disposed between the sealing ring and an inner side of the housing, a top end of the inner sleeve disposed in the head cover, a bottom end of the filter element disposed at an inner side of the sealing ring, a top end of the filter element disposed in the head cover, a gap is formed between said inner sleeve and the housing, the inlet in communication with the gap, the top end of said inner sleeve provided with first filtrate openings, the top end plate provided with a first baffle structure and second baffle structures, second filtrate openings disposed in the top end plate in the second baffle structures in communication with the interior region of the sleeve, the first filtrate openings located on the same level with the first baffle structure and the second baffle structures, and the bottom end of the filter element further provided with a first outlet communicating with the second outlet;

wherein water flow enters into the gap from the inlet of the housing, passes through the first filtrate openings in the inner sleeve, enters into the second filtrate openings in the top end plate after being obstructed by the first baffle structure and the second baffle structures, then passes through the filter element into the first outlet in the bottom end of the filter element towards the second outlet in the housing and flows out of the housing.

2. The filter device according to claim 1, wherein said sealing ring divides the inner bottom face of the housing into an in-ring bottom plate and an out-ring bottom plate, a bottom edge of said inner sleeve contacting with the out-ring bottom plate and a bottom edge of the filter element contacting with the in-ring bottom plate.

3. The filter device according to claim 1, wherein said first filtrate openings are a plurality of notch structures disposed at the top end of the inner sleeve, and the top shape of said notch structures matches and contacts the inner wall shape of the head cover.

4. The filter device according to claim 1, wherein said filter element comprises a movably connected laminated fixator and a movable base, an upper end of the laminated fixator provided with the top end plate comprising a disk-shaped structure and provided with the first baffle structure, the second baffle structures and the second filtrate openings;

wherein said inner sleeve is a tubular structure with a large diameter upper end connected with a smaller diameter lower end, and a joint is a horizontal step, the top end plate being disposed at the horizontal step of the inner sleeve, of which the diameter matches the large diameter of the inner sleeve.

5. The filter device according to claim 4, wherein said first baffle structure is disposed at the centre of the top end plate, with a structure of a plurality of bar-shaped projections connected with each other at one end, adjacent two bar-shaped projections forming an angle $\theta$, and each angle $\theta$ being equal.

6. The filter device according to claim 5, wherein the number of said second baffle structures is equal to the number of the angles $\theta$ with one to one correspondence, and distances of each second baffle structure to the centre of the top end plate are the same;

wherein the second baffle structures are "["-shaped structures consisting of three baffles, the notch direction of each of the "["-shaped structures is opposite to the direction of the corresponding angle $\theta$, and the top of the "["-shaped structures matches the shape of the inner wall of the head cover.

7. The filter device according to claim 6, wherein said second filtrate openings are through-holes disposed in the region of said "["-shaped structures.

8. The filter device according to claim 4, wherein limiting strips are connected under the top end plate of said laminated fixator, said limiting strips comprise a structure of a plurality of fenders connected with each other, the number of said fenders is the same as the number of the second baffle structures, each fender disposed between every two through-holes, being at the lower part of the through-holes, and free ends of said limiting strips are provided with buckling structures.

9. The filter device according to claim 8, wherein an outer side of said movable base is provided with a sealing groove structure for placing a sealing circle, while an inner side is provided with a limiting ring matching the buckling structures on the limiting strips.

10. The filter device according to claim 4, wherein said first outlet comprises a connection gap between the laminated fixator and the movable base, and the lower part of the connection gap comprises the second outlet disposed on the housing.

* * * * *